US012608468B2

(12) United States Patent　　　　(10) Patent No.:　US 12,608,468 B2

Tivadar et al.　　　　　　　　　　　　(45) Date of Patent:　　Apr. 21, 2026

(54) AGGREGATE EVENT PROFILES FOR DETECTING MALICIOUS MOBILE APPLICATIONS

(71) Applicant: Bitdefender IPR Management Ltd., Nicosia (CY)

(72) Inventors: Marius M. Tivadar, Baia Mare (RO); Alexandra S. Bocereg, Timisoara (RO); Razvan G. Gosa, Bumbesti-Jiu (RO)

(73) Assignee: Bitdefender IRP Management Ltd., Nicosia (CY)

( * ) Notice: Subject to any disclaimer, the term of this patent is extended or adjusted under 35 U.S.C. 154(b) by 202 days.

(21) Appl. No.: 17/821,493

(22) Filed: Aug. 23, 2022

(65) Prior Publication Data

US 2024/0070268 A1　　Feb. 29, 2024

(51) Int. Cl.
*G06F 21/55*　　　　(2013.01)

(52) U.S. Cl.
CPC ...... *G06F 21/554* (2013.01); *G06F 2221/031* (2013.01)

(58) Field of Classification Search
CPC ............. G06F 21/554; G06F 2221/031; G06F 21/00–88; G06F 2221/00–2153; H04L 9/00–50; H04L 2209/00–88; H04L 63/00–308; H04L 2463/00–146
See application file for complete search history.

(56) References Cited

U.S. PATENT DOCUMENTS

| | | | | | |
|---|---|---|---|---|---|
| 10,089,465 | B2 * | 10/2018 | Hajmasan | ............... | G06F 21/55 |
| 10,108,634 | B1 * | 10/2018 | Pal | ........................... | H04L 63/20 |
| 10,650,651 | B1 * | 5/2020 | Roberts | ............ | G08B 13/19652 |
| 10,728,261 | B2 * | 7/2020 | Paine | ..................... | G06F 21/552 |
| 10,791,134 | B2 * | 9/2020 | Gervais | ............... | G06F 16/1748 |
| 11,005,860 | B1 | 5/2021 | Glyer | | |

(Continued)

FOREIGN PATENT DOCUMENTS

| | | | | | |
|---|---|---|---|---|---|
| TW | 202009765 | A | * | 3/2020 | ............. G06F 21/54 |
| WO | 2014149053 | A | | 9/2014 | |
| WO | WO-2021080757 | A1 | * | 4/2021 | ......... G06F 21/6245 |

OTHER PUBLICATIONS

European Patent Office (EPO), International Search Report and Written Opinion mailed Nov. 6, 2023 for PCT International Patent Application No. PCT/EP2023/072883, international filing date Aug. 21, 2023, priority date Aug. 23, 2022.

*Primary Examiner* — Rupal Dharia
*Assistant Examiner* — Raghavender Cholleti
(74) *Attorney, Agent, or Firm* — Law Office of Andrei D Popovivi, PC

(57)　　　　　　ABSTRACT

Described systems and methods protect client devices such as personal computers and IoT devices against malicious software. In some embodiments, a plurality of client devices report the occurrence of various events to a security server, each such event caused by a local instance of a target application (e.g., mobile app) executing on a respective device. The security server then collates the behavior of the respective target application across the plurality of client devices. Some embodiments compute an aggregate event set and/or sequence combining events detected on one device with events detected on other devices, and determine whether the target application is malicious according to the aggregate event set/sequence.

17 Claims, 7 Drawing Sheets

(56) References Cited

U.S. PATENT DOCUMENTS

| | | | | |
|---|---|---|---|---|
| 2012/0110174 | A1* | 5/2012 | Wootton ............. | H04L 63/1416 |
| | | | | 709/224 |
| 2013/0305368 | A1* | 11/2013 | Ford ..................... | G06F 21/566 |
| | | | | 726/23 |
| 2017/0255777 | A1* | 9/2017 | Ford ..................... | G06F 21/566 |
| 2018/0046800 | A1* | 2/2018 | Aoki ...................... | G06F 21/56 |
| 2018/0121461 | A1* | 5/2018 | Natarajan ........... | G06F 16/1748 |
| 2018/0189488 | A1* | 7/2018 | Arora ........................ | G06F 8/71 |
| 2018/0330257 | A1 | 11/2018 | Dodson et al. | |
| 2019/0163598 | A1* | 5/2019 | Harutyunyan ........ | G06F 21/552 |
| 2019/0207969 | A1* | 7/2019 | Brown ................. | G06F 21/552 |
| 2019/0268302 | A1 | 8/2019 | McDonald | |
| 2020/0067960 | A1 | 2/2020 | Cochin et al. | |
| 2020/0186544 | A1* | 6/2020 | Dichiu .................. | G06F 21/552 |
| 2020/0244673 | A1 | 7/2020 | Stockdale et al. | |
| 2020/0314117 | A1* | 10/2020 | Nguyen ................ | H04L 63/145 |
| 2021/0026952 | A1* | 1/2021 | Eggleton .............. | G06F 21/554 |

* cited by examiner

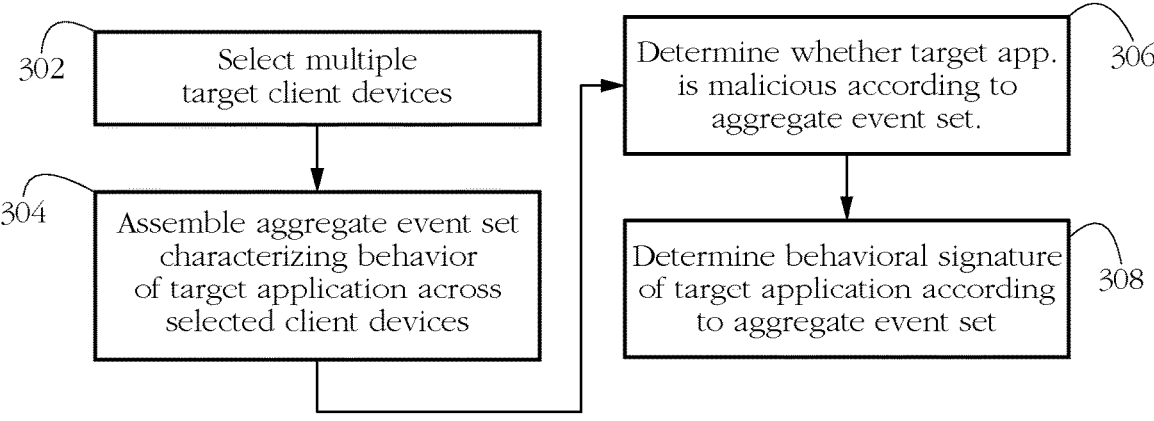

302 Select multiple target client devices

304 Assemble aggregate event set characterizing behavior of target application across selected client devices 306 Determine whether target app. is malicious according to aggregate event set.

308 Determine behavioral signature of target application according to aggregate event set

FIG. 6-A

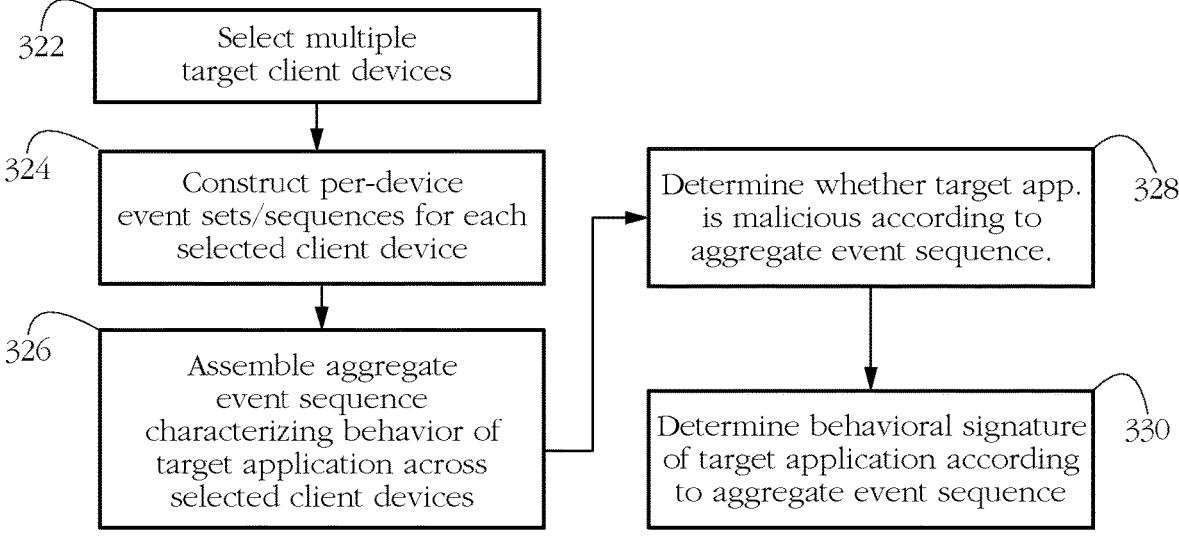

322 Select multiple target client devices

324 Construct per-device event sets/sequences for each selected client device

326 Assemble aggregate event sequence characterizing behavior of target application across selected client devices 328 Determine whether target app. is malicious according to aggregate event sequence.

330 Determine behavioral signature of target application according to aggregate event sequence

FIG. 6-B

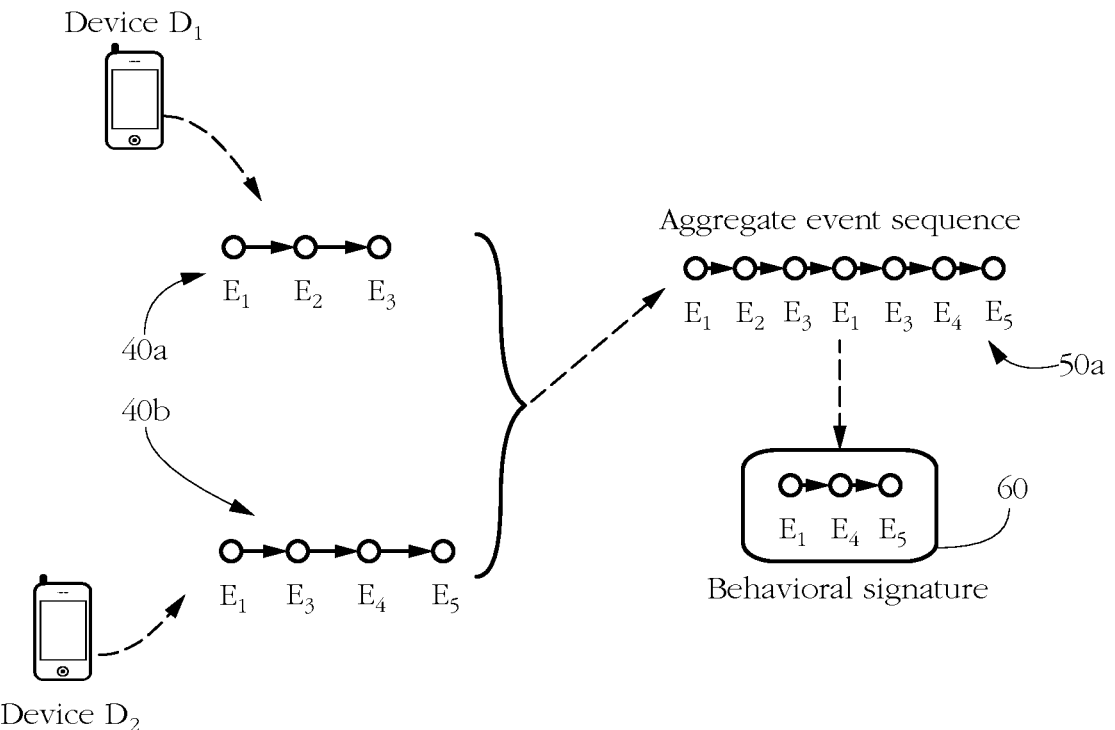
FIG. 7-A
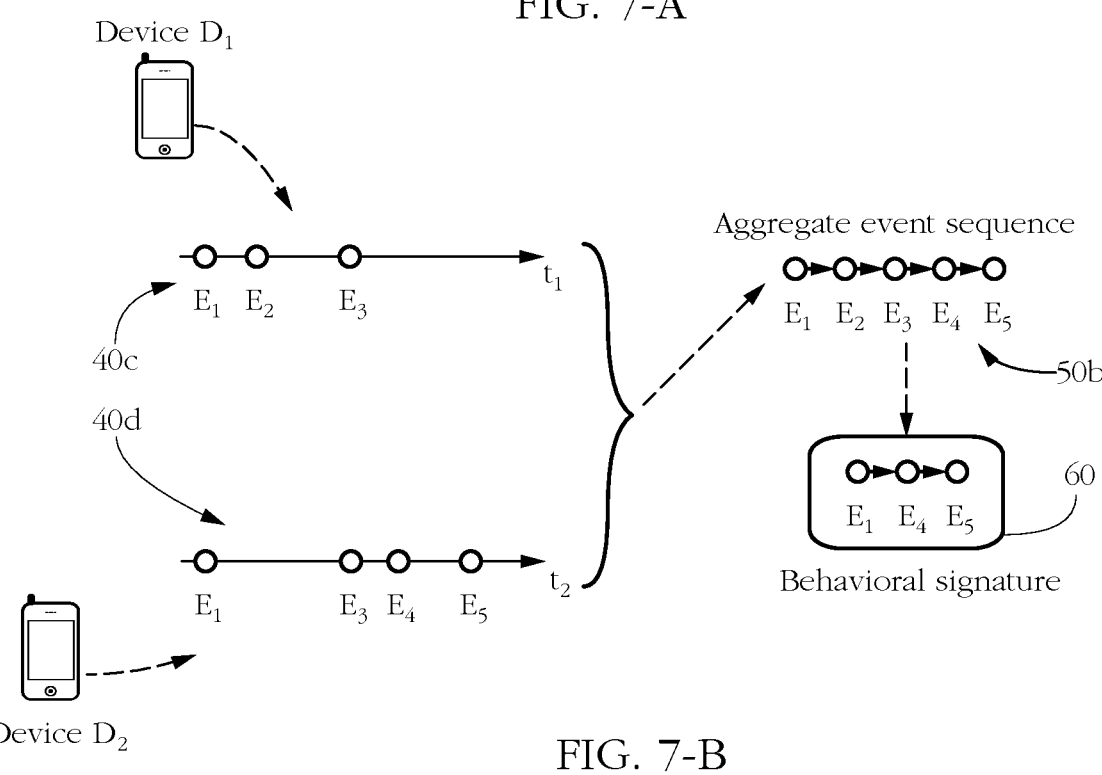
FIG. 7-B

FIG. 7-C

Aggregate event set/sequence    50

| | Event type | 71 | 132 | 12 | 21 | 71 |
|---|---|---|---|---|---|---|
| | Ubiquity measure | 15 | 1 | 1 | 3 | 3 |
| | Time of occurrence | 0.11 | 0.15 | 0.2 | 0.7 | 0.98 |
| | Geo-location indicator | CH RO UK ... | CH | CH | CH RO RO | SE SE NL |
| | | ... | ... | ... | ... | ... |

AGGREGATE EVENT PROFILES FOR DETECTING MALICIOUS MOBILE APPLICATIONS

BACKGROUND

The invention relates to computer security, and in particular to protecting users and devices against malicious software.

Malicious software, also known as malware, affects a great number of computer systems worldwide. In its many forms such as computer viruses, spyware, and ransomware, malware presents a serious risk to millions of computer users, making them vulnerable to fraud, loss of data and sensitive information, identity theft, and loss of productivity, among others. The explosive growth in mobile computing has only exacerbated computer security risks, with millions of devices such as smartphones and tablet computers constantly connected to the Internet and acting as potential targets for malware. In particular, on mobile platforms, malware may masquerade as bona-fide applications including games, news, and messaging platforms, thus tricking unsuspecting users into installing them. In some cases, the user may be completely unaware of any malicious activities happening under the hood of an apparently legit and entertaining interface.

Conventional methods of protecting against malware include executing security software on the respective devices. Detection methods typically include static analysis wherein target software is compared to a library of malware-indicative 'code signatures', and behavioral analysis wherein the security software monitors the target software for indications of malicious behavior. In response to detecting a malicious agent, security software may quarantine or prevent further its execution.

Sophisticated malware can often evade such countermeasures. Some malware refrains from malware-indicative behavior for extended periods of time, tricking security software into classifying it as benign. Some malware may tailor its behavior according to a type of device (e.g. smartphone vs. tablet, one manufacturer or model vs. another), a type of operating system, a current geographical location of the respective device, etc. Some malware further selects its victims by searching the respective device (e.g., smartphone) for indicators of a user's worth to the attacker. For instance, malware may determine what other software is currently installed on the respective device, and search for specific applications such as banking, social media, etc. Other malware may monitor a user's pattern of accessing various applications, online resources, etc. Such malware may then launch an attack (e.g., a series of malicious actions) only on carefully selected devices and/or against carefully selected users, when the respective attack is seen as more likely to pay off.

When attacks occur only on a small fraction of devices infected with a malicious software agent, conventional security software may have a difficult time protecting the respective users and devices. Evasive measures as described above substantially complicate the observation of an application's malicious behavior 'in the wild', and therefore hinder the development of a behavioral signature usable to classify the respective application as malicious. Meanwhile, the lack of a behavioral signature for detecting the respective malicious agent leaves a potentially large number of users unprotected.

There is therefore considerable interest in developing computer security systems and methods capable of quickly and efficiently responding to emerging threats against mobile computing platforms.

SUMMARY

According to one aspect, a method of protecting a plurality of client devices against malware comprises employing at least one hardware processor of a computer system to select a plurality of events from an event pool according to a cause of occurrence of the plurality of events, the plurality of events selected to all have been caused by a target software application. A first event of the plurality of events was caused by one instance of the target application executing on a client device of the plurality of client devices, and a second event of the plurality of events was caused by another instance of the target application executing on another client device of the plurality of client devices. The method further comprises employing the at least one hardware processor to arrange the selected plurality of events according to a time of occurrence of each event to form an aggregate event sequence comprising the first and second events. The method further comprises employing the at least one hardware processor to determine whether the target application is malicious according to the aggregate event sequence.

According to another aspect, a computer system comprises at least one hardware processor configured to select a plurality of events from an event pool according to a cause of occurrence of the plurality of events, the plurality of events selected to all have been caused by a target software application. A first event of the plurality of events was caused by one instance of the target application executing on a client device of a plurality of client devices, and a second event of the plurality of events was caused by another instance of the target application executing on another client device of the plurality of client devices. The at least one hardware processor is further configured to arrange the selected plurality of events according to a time of occurrence of each event to form an aggregate event sequence comprising the first and second events. The at least one hardware processor is further configured to determine whether the target application is malicious according to the aggregate event sequence.

According to another aspect, a non-transitory computer-readable medium storing instructions which, when executed by at least one hardware processor of a computer system, cause the computer system to select a plurality of events from an event pool according to a cause of occurrence of the plurality of events, the plurality of events selected to all have been caused by a target software application. A first event of the plurality of events was caused by one instance of the target application executing on a client device of a plurality of client devices, and a second event of the plurality of events was caused by another instance of the target application executing on another client device of the plurality of client devices. The instructions further cause the computer system to arrange the selected plurality of events according to a time of occurrence of each event to form an aggregate event sequence comprising the first and second events. The instructions further cause the computer system to determine whether the target application is malicious according to the aggregate event sequence.

BRIEF DESCRIPTION OF THE DRAWINGS

The foregoing aspects and advantages of the present invention will become better understood upon reading the following detailed description and upon reference to the drawings where:

FIG. 6-A shows an exemplary sequence of steps carried out by a behavior analyzer according to some embodiments of the present invention.

FIG. 6-B shows an alternative exemplary sequence of steps carried out by the behavior analyzer according to some embodiments of the present invention.

FIG. 7-A illustrates an exemplary aggregate event sequence assembled from events received from multiple client devices, and an exemplary behavioral signature extracted from the respective aggregate event sequence according to some embodiments of the present invention.

FIG. 7-B shows another exemplary aggregate event sequence assembled from events received from multiple client devices, according to some embodiments of the present invention.

FIG. 7-C shows yet another exemplary aggregate event sequence assembled from events received from multiple client devices, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized collection of data. A hash is the numerical result of applying a hash function to a token (e.g., character string, code snippet, etc.). Hash functions map data of arbitrary size to fixed-size values. Exemplary hashing functions/procedures include, among others, cyclic redundancy check (CRC), checksums, message digest functions (e.g., MD5), and secure hash algorithms (SHA). Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figures 1, 2:
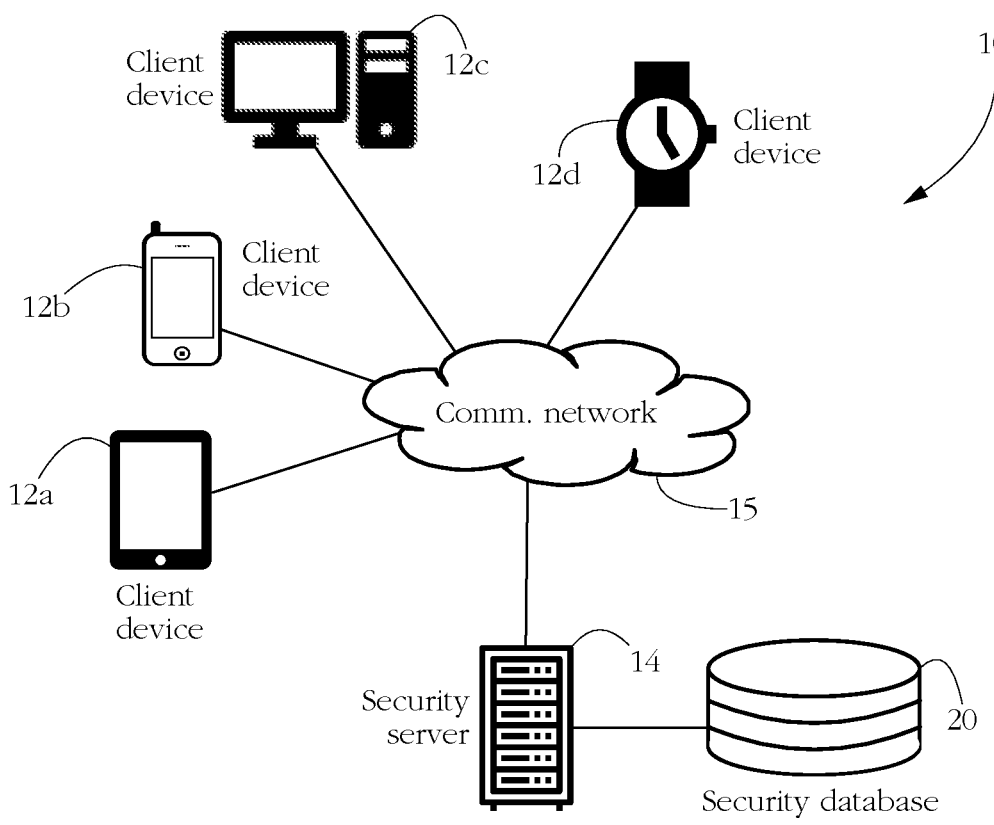
FIG. 1 shows an exemplary set of client devices protected against malicious software according to some embodiments of the present invention.
FIG. 2 shows a typical data exchange between a client device and a security server according to some embodiments of the present invention.

FIG. 1 shows a system 10 for protecting a set of client devices 12*a-d* against malicious software according to some embodiments of the present invention. Client devices 12*a-d* generically represent any electronic device having a processor, a memory, and a communication interface enabling the respective device to communicate with other devices/computer systems. Exemplary client devices 12*a-d* include personal computers, mobile computing platforms (e.g., laptop computers, tablets, mobile telephones), entertainment devices (e.g., TVs, game consoles), wearable devices (e.g., smartwatches, fitness bands), and household appliances (e.g., refrigerators, washing machines), among others. In the exemplary configuration of FIG. 1, client devices 12*a-d* are connected to a communication network 15, which may include a local area network (e.g., home network, corporate network, etc.), a wide-area network and/or the Internet. Network 15 generically represents a set of hardware (physical layer) and software interfaces enabling the transfer of data between devices 12*a-d* and other entities connected to network 15. Client devices 12*a-d* may execute various software, e.g., Internet browsing, document processing, gaming, electronic messaging, and social media applications, etc., exchanging data with other computer systems (e.g., remote servers) over network 15.

FIG. 1 further shows a security server 14 connected to communication network 15. Server 14 generically represents a set of communicatively coupled computer systems, which may or may not be in physical proximity to each other. In some embodiments, server 14 protects client devices 12*a-d* by analyzing the behavior of various software applications executing on the respective client devices to determine whether the respective applications engage in malicious activities, such as fraud or theft of sensitive data, among others. In some embodiments, server 14 interfaces with a security database 20 comprising an organized collection of computer security data. For instance, database 20 may store a collection of reference hashes usable to assess the integrity of an application executing on protected client devices 12*a-d*, and/or a set of code signatures usable to determine whether a selected application comprises malicious software. In yet another example, security database 20 may store a collection of behavioral signatures characterizing a set of malicious and/or benign software applications, said behavioral signatures enabling server 14 to determine whether a selected application executing on a protected client device 12a-d is malicious. In some embodiments, database 20 may further store a set of event indicators indicative of various events occurring on client devices 12a-d and caused by the execution of various software applications, as described in more detail below.

In some embodiments, database 20 may further store a plurality of client records related to client devices 12a-d and/or to the users of the respective client devices. In one example, each client record corresponds to a distinct client device 12a-d. A client record may store a set of identifiers of the respective client device (e.g. a media access control— MAC address, an International Mobile Equipment Identity—IMEI number, a network/IP address, etc.). Another exemplary client identifier may comprise a device-specific token (e.g., a hash) uniquely associated with an instance of a security application executing on the respective client device. The operation of the security application is detailed below.

In some embodiments, a client record may further include a device profile of the respective client device 12a-d, including a set of hardware and/or software characteristics of the respective device. An exemplary device profile may include an indicator of a device type (e.g., smartphone, smartwatch, tablet computer, etc.), an indicator of a device model/version (e.g. iPhone®12, Samsung® GalaxyWatch®4, etc.), and an indicator of a type and/or version of an operating system (e.g., iOS® 15.5, Android® 12, etc.). Other device profile data may include a list of applications currently installed on the respective device, an indicator of a physical location of the respective device (e.g., a set of GPS coordinates, an indicator of a country/city/region, etc.), and a set of current values of various operating system settings of the respective device, among others. In some embodiments, device profile data may include user profile data, for instance selectively placing the user of the respective client device within a user category according to typical use (e.g. business, personal), personal interests (e.g., gaming, shopping, social networks). Such user profile data may be determined for instance according to the respective user's online habits, or any other method known in the art.

Database 20 may be formatted and stored according to any standard known in the art. Exemplary database formats include a relational database, an extensible markup language (XML) database, a spreadsheet, and a key-value store, among others. Server 14 may be configured to selectively retrieve and/or insert data into database 15, for instance using structured queries.

FIG. 2 shows an exemplary data exchange between a client device 12 and security server 14 according to some embodiments of the present invention. Device 12 generically represents any of client devices 12a-d in FIG. 1. In some embodiments, security software executing on device 12 is configured to detect an occurrence of an event caused by or otherwise directly related to the execution of a selected software application on the respective device, and transmit an event indicator 16 describing the respective event to security server 14. An exemplary event indicator 16 may comprise an indicator of an event type of the respective event, and may further include a time stamp indicative of a time of occurrence of the respective event. In some embodiments, event indicator 16 may further include an identifier of client device 12, e.g., an ID tag associated with the respective instance of the security application, allowing server 14 to unambiguously associate the respective event with device 12. Event indicator 16 may further include an identifier (e.g., integrity hash) of an application whose execution caused the respective event.

In some embodiments, security software executing on device 12 may be further configured to determine various device profile data 17 characterizing the respective device and/or user, and to transmit profile data 17 to server 14. Exemplary device profile data includes a make and model of device 12, a geolocation indicator, etc. (See e.g., description of device profiles above.)

In some embodiments, server 14 may further transmit a security notification 18 to client device 12, notification 18 indicating for instance that a selected application installed and/or currently executing on device 12 is malicious. In response to receiving notification 18, security software executing on device 12 may display a warning to a user of device 12, and may further block execution of, or partially disable the functionality of the respective malicious application. Notification 18 may further include an indicator of whether the respective instance of the application has actually performed malicious activities on the respective device, and/or data enabling the local security software to display a set of instructions for mitigating the effects of the respective malware. An exemplary warning displayed to the user may include a hyperlink to an online description of the respective malware agent and instructions for recovering from its effects (e.g., instructions for removing the respective malicious application, changing various operating system settings, etc.).

Figure 3:
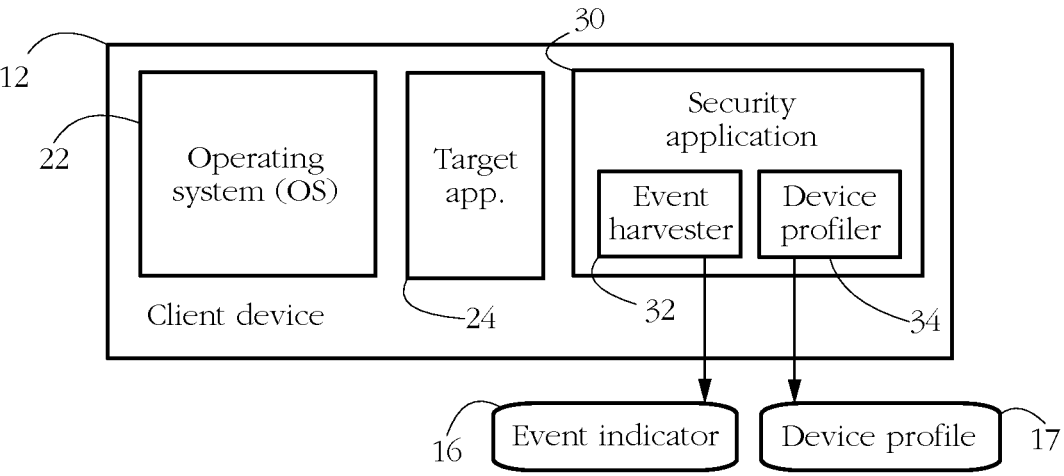
FIG. 3 illustrates exemplary components executing on a client device according to some embodiments of the present invention.

FIG. 3 shows exemplary components of client device 12 according to some embodiments of the present invention. Some or all of the illustrated components may be implemented as software executing on a hardware processor of client device 12. However, a skilled artisan will know that some of the respective functionality may be implemented in dedicated hardware and/or in a combination of hardware and software. An operating system (OS) 22 provides an interface between the hardware of client device 12 and other computer programs such as a target application 24 executing on the respective client device. Exemplary operating systems include, among others, Windows®, MacOS®, iOS®, and Android®.

Target application 24 generically represents any software application such as word processing, image processing, spreadsheet, calendar, gaming, social media, web browser, and electronic communication applications, among others. The term 'application' herein denotes a standalone, executable piece of software distinct from the operating system, and which may be invoked by a user independently of other applications (as opposed to, for instance, a software library or a subroutine forming a part of another computer program). Exemplary applications 24 include smartphone apps downloaded from a store such as the App Store by Apple®, Inc. or Google® Play®. An artisan will know that the inclusion of only one target application 24 in FIG. 3 is not meant to be limiting. Client devices 12 such as smartphones and personal computers typically carry dozens of installed applications. The modifier 'target' is included merely for clarity, to indicate that application 24 forms the object of a security analysis (malware detection) as described herein. However, such language does not restrict said analysis to just one target application; some embodiments may monitor the behavior of multiple apps concurrently.

Furthermore, the present disclosure uses the term 'target application' to also refer to all identical instances of the respective application, irrespective of the device where the respective instance is executing. As described in detail below, some embodiments collate events caused by target application 24 across multiple devices, for instance to construct an aggregate event sequence. Such language should not be construed as indicating that all such events are caused by a single instance of the respective application; rather, distinct events may be caused by distinct instances of application 24. A verdict of 'malicious' or 'clean' determined for application 24 therefore applies to all identical instances of the respective application.

In some embodiments, a security application 30 is configured to collaborate with security server 14 to determine whether target application 24 poses a computer security risk to a user. Security application 30 may form a part of a larger software suite which may provide various security services such as a traffic filter, virtual private networking (VPN), anti-spam, parental control, etc. In some embodiments, security application 30 further includes an event harvester module 32 configured to detect the occurrence of various software and/or hardware events caused by the execution of target application 24, and transmit a computer-readable account of the respective events to security server 14 in the form of event indicator 16. Detected events may or may not be malware-indicative per se; some events may be malware-indicative when occurring together with other events and/or when occurring in a particular sequence, as further detailed below.

Exemplary detected events include application installs, uninstalls, and updates, process/application launches and terminations, the spawning of child processes (e.g., forking), dynamic loading/unloading of a library, execution of a particular processor instruction (e.g., system call), file events such as file creation, write, deletion, etc., and setting various OS parameters (e.g., Windows® registry events, permission/privilege changes), among others. Other exemplary events include a requests to access a peripheral device (e.g., hard disk, SD card, network adapter, microphone, camera), a request to access a remote resource (e.g., a hypertext transfer protocol—HTTP request to access a particular URL, an attempt to access a document repository over a local network), a request formulated in a particular uniform resource identifier scheme (e.g., a mailto: or a ftp: request), and an attempt to send an electronic message (e.g., email, short message service—SMS, etc.), among others. Yet other exemplary events comprise moving a user interface/window of target application 24 in and/or out of focus/foreground.

Some embodiments may detect various timing-related events, such as periods of inactivity, i.e., time gaps between events and/or time intervals when the respective client device is idle, registers no user activity, or carries out only internal system tasks. Such inactive periods may be further differentiated into short time gaps (e.g., of the order of a seconds) and long time gaps (e.g., of the order of minutes to hours). Other timing-related events may include, for instance, a sequence of events occurring in quick succession/bursts of activity.

Other exemplary detected events may comprise receiving and/or displaying a particular type of content, such as a SMS including a hyperlink, an HTML document including a login form, a payment interface, an advertisement, etc.

Exemplary events specific to, or particularly relevant to the security of, mobile devices include screen toggles (on/off), a change in the label/name/icon of an application, and a screen grab. Other examples include a request to grant a specific type of permission (e.g., admin, accessibility), permissions requested dynamically (i.e., during various stages of execution, as opposed to at installation), and granting persistency (e.g., a foreground service started dynamically by the respective application). Yet other examples include an attempt to prevent an uninstall of the respective application and displaying an overlay on top of an OS settings interface (such an overlay may trick an unsuspecting user into granting the respective application unwanted permissions).

Event detection may be device-type-specific and may comprise any method known in the art of computer security. In one example wherein client device 12 is a personal or laptop computer, upon detecting the launch of target application 24, event harvester 32 registers the respective application and/or its associated processes with an event logging service of OS 22 (e.g., event tracking for Windows®—ETW, Syslog in UNIX®). In response, harvester 32 may receive notifications of various events occurring during execution of the respective processes, either in real time or in log form. Event logging tools typically generate a list of event descriptors including a timestamp for each event, a numerical code identifying an event type, an indicator of a type of process or application that generated the respective event, and other event parameters. In such embodiments, harvester 32 may detect the occurrence of a target event by parsing the respective event log.

In another example of event detection, event harvester 32 may modify a set of native functions of OS 22 by inserting redirecting instructions (also known as hooks or patches). In this manner, when a process executing on client device 12 calls the respective OS function, execution is redirected to a callback routine notifying harvester 32 about an attempt to execute the respective OS function. When the hooked function is instrumental in a monitored event (e.g., file creation, process launch, etc.), an attempt to call the respective function may serve as an indicator of the occurrence of the respective event.

In yet another example of event detection, electronic communications sent by the respective client device may be detected by installing a proxy module configured to intercept domain name service (DNS) queries and/or HTTP requests transmitted by the respective client device.

Some operating systems such as those executing on smartphones, wearables, etc., may not allow such manipulations. However, other tools may be available to detect the occurrence of various events. For instance, some OSs expose an application programming interface (API) that enables registering callbacks for different notifications, inspecting network traffic, SMS/MMS manipulation, detecting access to storage devices (e.g., SD card), etc. Some embodiments of event harvester 32 use functions of an accessibility API to access on-screen content and detect user interactions with the respective device and/or applications. Some embodiments may further use artificial intelligence (e.g., natural language processing, computer vision, etc.) or other means of analyzing a content displayed on screen.

Event detection may carry a substantial computational cost and may therefore impact user experience, especially on mobile platforms which typically have less computing power than personal computers. Furthermore, some event detection activities may require specific permissions and/or OS settings which may not be activated on all client devices 12a-d. To minimize the impact of event detection activities, some embodiments of event harvester 32 are configured so that some event detection activities can be selectively turned on or off. The decision whether to activate or de-activate detection of specific events may be taken locally or remotely, e.g., by security server 14. As illustrated in FIG. 2, in some embodiments server 14 sends out a data request 19 to client 12, data request 19 comprising an indicator of a category of events and an associated flag instructing the respective event harvester 32 whether to monitor the respective category of events or not. In response to receiving data request 19, event harvester 32 may reconfigure various event-detection devices of the respective client to start and/or stop detection of the respective event type or category.

In one exemplary use-case scenario, to conserve resources and minimize impact to the user experience, event harvester 32 may be configured to monitor each application installed on the respective client device for a pre-determined time period (e.g., a few minutes, a few hours, etc.) following its launch, and then partially or totally switch off event detection activities for the respective application. Such embodiments rely on the observation that most common malware typically executes its payload early in the lifecycle of an application. However, if at any time server 14 is notified about the occurrence of a suspect event caused by the respective application on some protected client, server 14 may send out data requests 19 to other clients running the respective application, effectively requesting that their local event harvester 32 restart event detection operations for the respective application.

In another exemplary use-case scenario, event harvester 32 may be configured to only monitor a subset of event types, which may be relatively inexpensive to detect and therefore may only minimally impact clients. However, specific, more computationally expensive event detection activities may be turned on at any time, when malware intelligence suggests that an attack is imminent. For instance, server 14 may select a set of clients according to their geographical location (e.g., Scandinavian clients) and turn on detection of certain events on the selected clients based on knowledge of an ongoing malware campaign targeting clients located within the respective country/region.

In yet another exemplary use-case scenario, security server 14 may divide the set of protected client devices 12a-d running a particular target application 24 into multiple subgroups, each subgroup corresponding to a distinct subset of monitored events. Stated otherwise, server 14 may instruct devices in each subgroup to only listen for a respective subset of event types, for instance by transmitting data requests 19 to each device, each request 19 specifying which subset of events to monitor on the respective device. Such strategies may avoid spending valuable resources on monitoring for all event types (some of which may be particularly expensive to detect) on all devices. Meanwhile, server 14 may reconstruct a 'complete' behavior of the respective target application by merging event profiles gathered from multiple devices, as further discussed below.

In yet another exemplary use-case scenario, the complete set of event types that can be monitored on a client device may be divided into (possibly overlapping) subgroups, each event subgroup specific to a distinct category of malware and/or attack scenario. Stated otherwise, the detection of an event from a selected subgroup may be indicative of the presence of a particular type of malicious agent or attack. In such embodiments, event harvester 32 may be configured to monitor a relatively small subset of event types, comprising events selected from multiple event subgroups. In response to detecting the occurrence of an event (hence a suspicion of malware), harvester 32 may selectively turn on detection of other event types from the same subgroup as the triggering event.

In some embodiments, event harvester 32 is configured to attribute each detected event to an application (e.g., target app 24) executing on the respective client and causing the occurrence of the respective event. To precisely distinguish among various target applications, some embodiments compute an application ID which is unique to each application. Exemplary application IDs may be constructed according to an application name and further according to a version indicator and an indicator of an OS (e.g., WhatsApp® version 2.22.17.70 for Android®). In another example, the application ID may comprise a hash of a piece of code of the respective application, for instance an integrity hash used for verifying the integrity of the app's code prior to installation or prior to the first execution on the respective device. Some embodiments attach the respective application ID to event indicator 16, enabling security server 14 to collate behavioral data across multiple devices running identical instances of the respective target application. A subsequent verdict of 'clean', 'malicious', etc., then applies to all instances of the respective application, i.e., to all applications having the respective application ID, irrespective of the client device 12a-d they are executing on.

In some embodiments, security application 30 further comprises a device profiler module 34 configured to determine device profile 17, and transmit profile 17 to security server 14. Profiler 34 may use any method known in the art to extract device profile data about the respective device, such as a device ID (e.g., IMEI number), a hardware type, a hardware configuration, a type and version of OS 22, various OS settings, a current IP address, a list of currently installed applications, and a current geolocation, among others. Such information may be extracted for instance via specific function calls to a standard API exposed by OS 22. Some device profile data such as the current IP address may be determined by server 14 itself or by a proxy device (e.g., network gateway device mediating exchanges between the respective client device and server 14), for instance according to communication metadata.

Figure 4:
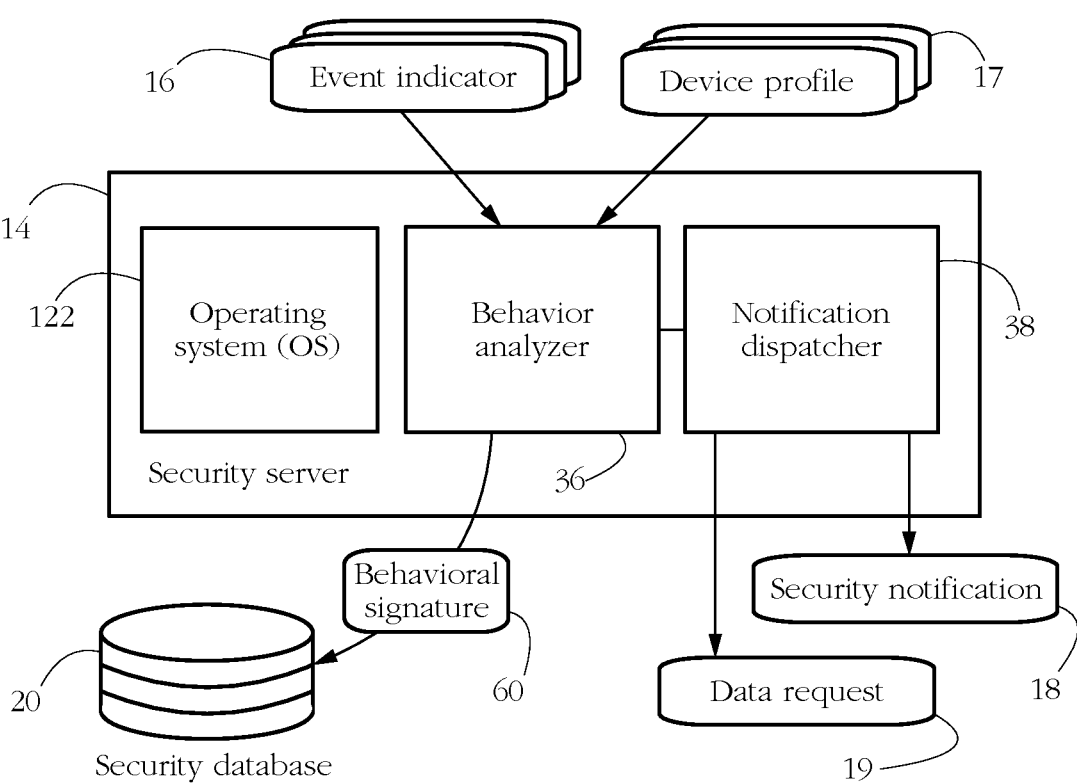
FIG. 4 shows exemplary components executing on the security server according to some embodiments of the present invention.

FIG. 4 shows exemplary components of security server 14 according to some embodiments of the present invention. A behavior analyzer 36, which may comprise a set of computer programs executing on a hardware processor of server 14, is configured to receive event indicator(s) 16 and device profile(s) 17 from multiple client devices 12a-d. Some such event indicators 16 describe events caused by the execution of distinct instances of the same target application, each such distinct instance executing on a distinct client device. In turn, device profile(s) 17 include a token (e.g., client ID) identifying the respective client device, and other data characterizing a hardware and/or software of the respective device. In response to receiving device profile(s) 17, some embodiments may create a client record corresponding to the respective client device, and store the respective client record in security database 20.

In some embodiments, behavior analyzer 36 is further configured to assemble an aggregate set and/or sequence of events which collectively describe the behavior of the respective target application across multiple client devices, as shown in detail below. Analyzer 36 may further analyze the aggregate set or sequence of events to derive a behavioral signature 60 associated with the respective target application, and to determine whether the respective target application is malicious. Behavioral signature data may be further stored in security database 20. The operation of behavior analyzed is described in detail below.

In some embodiments, security server 14 further includes a notification dispatcher 38 connected to behavior analyzer 36 and configured to formulate and selectively transmit security notification(s) 18 and/or data request(s) 19 to protected client devices 12*a*-*d* (FIG. 1). Transmission herein encompasses communicating directly with the respective clients, as well as placing a computer-readable encoding of the respective messages/notifications in a repository (e.g., cloud storage), from where they may be selectively retrieved by the respective client devices.

Figure 5:
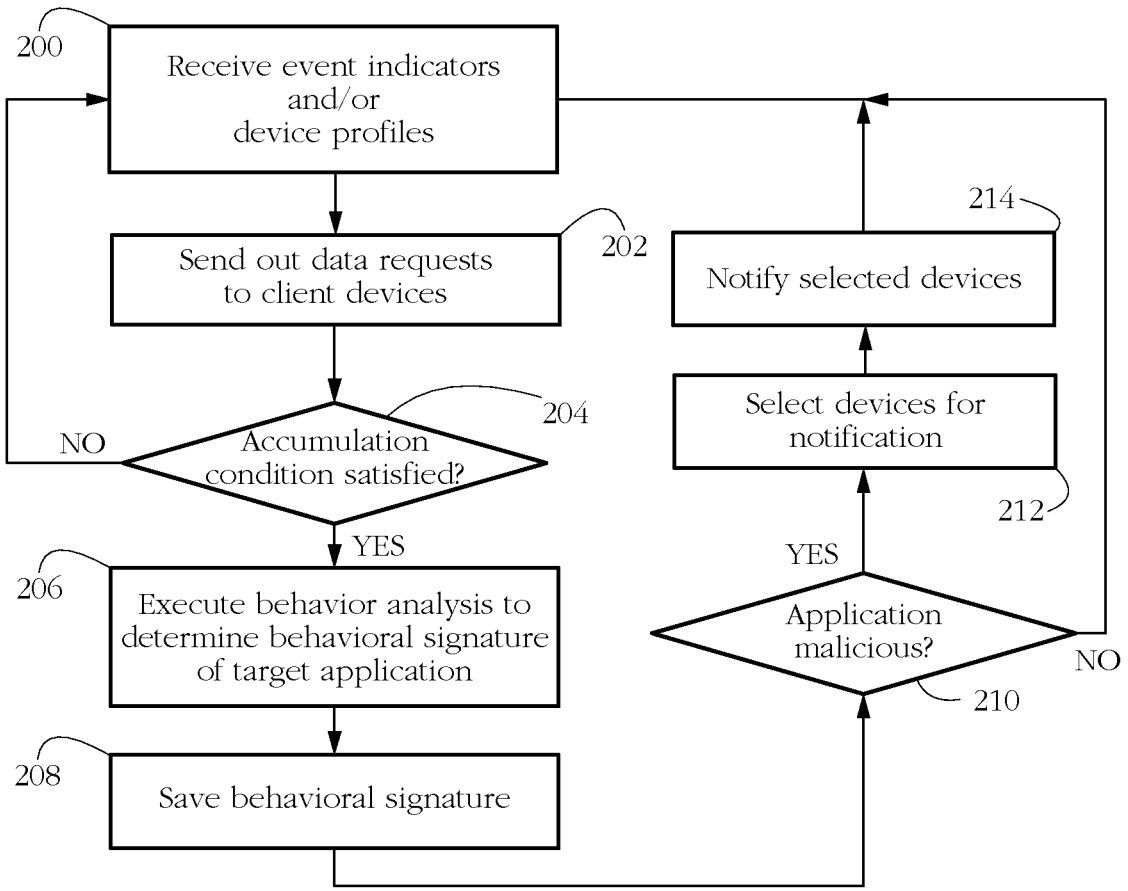
FIG. 5 illustrates an exemplary sequence of steps performed by the security server according to some embodiments of the present invention.

FIG. 5 shows an exemplary sequence of steps carried out by security server 14 according to some embodiments of the present invention. Server 14 may be configured to continuously receive event indicator(s) 16 and device profile(s) 17 from protected clients 12*a*-*d* (a step 200), until an accumulation condition is satisfied (a step 204). Such accumulation effectively creates an event pool which is then analyzed by behavior analyzer 36 to detect malicious behavior.

Exemplary accumulation conditions may include, among others, for each target application 24 (as identified by a distinct application ID) comparing a count of events with a pre-determined threshold and accumulating data for a pre-determined amount of time. More complex accumulation conditions may involve criteria such as device type, geolocation, etc. For instance, step 204 may compare a count of events detected on Android® smartphones from Germany with a pre-determined threshold. Another exemplary embodiment may accumulate event indicators until it has a good enough sample of events from various countries or regions.

Some embodiments may further adjust the type and/or quantity of forensic data collected by means of data requests 19 targeted at specific client devices 12*a*-*d* (a step 202). Such data requests may be used to selectively turn event detection on and/or off for specific event types, device types, device location, etc., as described above.

While events are accumulating (step 204 returns a NO), individual event indicators 16 may be processed by a specialized component of behavioral analyzer 36, for instance by creating a database record for each event indicator, said record comprising at least an indicator of a respective event type, an indicator (e.g. application ID) of a target application having caused the respective event, and an indicator (e.g., client ID) of a client device where the respective event has occurred. Such records may be stored in security database 20 for future reference and/or behavior analysis as detailed below.

When the event accumulation condition is satisfied, a step 206 may carry out a behavior analysis of target application 24. In some embodiments, step 206 comprises selecting events from the available event pool (e.g., the event indicators accumulated in steps 200-202-204) according to their cause, so that all selected events have been caused by instances of application 24 (identified for instance according to their respective application ID). Step 206 further comprises analyzing the selected event set as shown in detail below. Although the present description focuses on just one target application, an artisan will know that multiple target applications may be monitored concurrently, for instance by repeating step 206 identically for each monitored application.

FIGS. 6-A-B show alternative exemplary sequences of steps carried out by server 14 (e.g., behavior analyzer component 36, see FIG. 4) in step 206. A simple embodiment as illustrated in FIG. 6-A may only consider collections of individual events, without concern for the ordering of the respective events and/or about correlations between individual events. Stated otherwise, in some embodiments the behavior of an application may be characterized by just a set of events caused by the respective application (e.g., asking for permission to access the user's address book and sending an HTTP request to a particular Internet domain). To determine such a characteristic set of events, in a step 302 behavior analyzer 36 may select a set of client devices as event sources. In a simple example, analyzer 36 may aggregate events from all available sources, i.e., all events caused by the respective target application and reported during the current and/or previous accumulation cycles (steps 200-202-204 described above). Other embodiments may apply various device selection procedures to aggregate events selectively, for instance from a selected device type (e.g., smartphones), from devices running a particular type of OS 22 (e.g., Windows®, Android®, etc.), from devices located in selected regions (e.g., Eastern Europe), etc. Such source selection may allow for determining behavioral signatures with various degrees of granularity and specificity, and may enable detection of sophisticated malware. In practice, source selection may comprise identifying a subset of client devices according to device profiles 17 received from the respective clients, and selectively retrieving a set of event records from database 20 according to client IDs of the selected client devices.

In response to selecting a set of client devices and/or events, in a step 304 behavior analyzer 36 may construct an aggregate event set describing the behavior of the respective target application across the set of selected clients. An aggregate event set herein denotes a set constructed from events harvested from multiple sources, i.e., a set combining events having occurred on one client device with events having occurred on at least another client device. In an exemplary embodiment, behavior analyzer 36 may construct an aggregate event set according to a set union:

$$A = U_{i \in \Sigma} S_i,$$ [1]

wherein A denotes the aggregate event set, $\Sigma$ denotes the selected set of client devices, and $S_i$ denotes the set of events caused by the execution of the respective target application and detected on client device i. Some embodiments combine events received during the latest accumulation cycle with events previously detected on the respective client device, wherein all combined events are caused by instances of the same target application. In some embodiments, constructing aggregate event set A further includes deduplicating events, i.e., set A may not include two events of the same type.

In some embodiments, in a step 306 (FIG. 6-A) behavior analyzer 36 may further determine whether target application 24 is malicious according to the content of aggregate event set A. Such determination may proceed according to any method known in the art of computer security. In one example, behavior analyzer 38 may apply a set of previously derived heuristics to determine whether event set A is indicative of malice. For instance, some events may be malware-indicative themselves, others may indicate malice only when they occur together with other events. Such forensic knowledge may be derived automatically or by a security analyst based on the behavior of known malicious agents. Another exemplary embodiment may use artificial intelligence to determine whether aggregate event set A is indicative of malice. For instance, a set of artificial neural networks may be pre-trained on a training corpus of events characterizing the behavior of known malicious and benign applications. The trained network(s) may then receive an encoding of aggregate event set A and in response, output a label (clean/malicious) or a score indicative of a likelihood that the respective target application is malicious. The structure and training of such artificial intelligence systems goes beyond the scope of the present description; several such examples are known in the art.

A further step 308 may determine a behavioral signature of application 24 according to aggregate event set A. In some embodiments as illustrated in FIG. 6-A, behavioral signature 60 comprises a subset of aggregate event set A. Since set A was assembled from events recorded on multiple clients, distinct parts of signature 60 may have occurred on distinct client devices. To determine the behavioral signature, some embodiments of behavior analyzer 36 prune the aggregate event set, for instance removing various events which are not considered characteristic of the behavior of the respective application and/or are not considered informative for security. In one such example, an event comprising accessing a popular web resource may not be included in the behavioral signature, however a request to grant a particular permission (e.g., access to the microphone, etc.) may be included. Some such criteria for extracting behavioral signatures from aggregate event sets and sequences are described further below.

FIG. 6-B illustrates an exemplary sequence of steps performed by behavior analyzer 36 to determine a behavioral signature of target application 24 in a more sophisticated embodiment configured to analyze events in context, for instance as event sequences. Stated otherwise, in such embodiments the behavior of target application 24 is characterized not just by a set of individual events caused by the execution of the respective application, but also by the order in which the respective events have occurred, by an amount of time elapsed between the respective events, and/or by other inter-event correlations.

A step 322 may select a set of client devices, for instance according to criteria described above in relation to step 302 in FIG. 6-A. Next, in a step 324, for each selected device, behavior analyzer 36 may construct a per-device event set by selecting events having occurred on the respective client device from the available collection of events. Some embodiments further arrange the per-device event set into an ordered sequence according to a time of occurrence of each event. A further step 326 may merge the per-device event sets and/or sequences into an aggregate event sequence combining events having occurred on one device with events having occurred on at least another device of the selected set of clients. By combining events from multiple sources, the aggregate event sequence is herein said to describe a behavior of the target application across the selected client devices.

The process of calculating aggregate event sequences is further illustrated in FIGS. 7-A-B-C, wherein individual events are denoted as $E_i$, with i indexing event type. Stated otherwise, two events having the same index are events of the same type. In one example illustrated in FIG. 7-A, two per-device event sets consist of events detected and reported by client devices $D_1$ and $D_2$, respectively. Without loss of generality, devices $D_1$ and $D_2$ may represent any of client devices 12a-d in FIG. 1. The embodiment illustrated in FIG. 7-A further orders each event set according to a time of occurrence of members of the respective event set, to form per-device event sequences 40a and 40b, respectively, and constructs an exemplary aggregate event sequence 50a by concatenating per-device sequences 40a-b.

Another example of constructing an aggregate event sequence is illustrated in FIG. 7-B, wherein exemplary per-device event sequences 40c and 40d are harvested from devices $D_1$ and $D_2$, respectively. In constructing aggregate event sequence 50b from members of per-device sequences 40c-d, the illustrated embodiment determines the ordering of events according to an application-specific time of occurrence of each event, as opposed to a conventional 'time of the day'. An exemplary application-specific time comprises an amount of time elapsed since the occurrence of a reference event on the respective device, the reference event caused by the local instance of target application 24. For instance, an application-specific time may comprise a time elapsed since the launch of target application 24 on the respective device, since a user's logging into application 24 on the respective device, etc. Such embodiments rely on the observation that distinct instances of application 24 typically execute independently of each other, so events are typically not synchronized across multiple devices. However, viewing events in 'application time' may naturally align event histories across multiple devices, making patterns and anomalies more salient. For instance, the fact that event $E_1$ occurred at 2:34 AM on device $D_1$ and at 8:15 PM on device $D_2$ may be less informative in characterizing the behavior of target application 24 than the fact that event $E_1$ occurred on both devices approximately 10 seconds after the launch of the respective application. In FIG. 7-B, per-device event sequences 40c-d are shown in application time $t_1$ and $t_2$ specific to devices $D_1$ and $D_2$, respectively. For instance, a position of event $E_2$ on the $t_1$ line may be determined according to an amount of time separating the occurrence of the respective event from the launch of application 24 on device $D_1$. Similarly, a position of event $E_5$ on the $t_2$ line may be determined according to an amount of time separating the occurrence of the respective event from the launch of application 24 on device $D_2$. In constructing aggregate event sequence 50b, the position of each individual event $E_i$ within sequence 50b may be determined according to an 'application time' of the respective event, i.e., as $t_1(E_i)$ for events having occurred on device $D_1$, and as $t_2(E_i)$ for events having occurred on device $D_2$.

Some embodiments further process the aggregate event sequence. For instance, behavior analyzer 36 may determine whether an event deduplication condition is satisfied and when yes, remove at least one instance of a duplicate event from the aggregate event sequence. An exemplary event de-duplication condition determines whether two events of the same type have occurred on distinct clients approximately at the same application time. In FIG. 7-B, event $E_1$ occurs approximately simultaneously on both devices, and so does $E_3$, therefore aggregate event sequence 50b retains just one instance of each. In some embodiments, event deduplication conditions may further involve event metadata such as hardware type, OS version, geolocation, and event ubiquity (see discussion of such metadata below, in relation to FIG. 8), among others. For instance, some embodiments only deduplicate events which occur on a substantial proportion of client devices, or only deduplicate events that occur approximately at the same application time on devices with a similar device profile, etc.

FIG. 7-C shows yet another example of constructing an aggregate event sequence from events harvested from devices $D_1$ and $D_2$. In the illustrated example, ordering individual events into per-device event sequences 40e-f reveals two alternative histories separating events $E_1$ and $E_3$. FIG. 7-C shows an exemplary aggregate event sequence 50c configured to represent such alternative behaviors. In such embodiments, behavior analyzer 36 may be configured to identify 'anchor' events (such as $E_1$ and $E_3$ in the current example) within the set of events harvested from the selected devices, and construct aggregate event sequence 50c to allow multiple event histories only within intervals separating such anchor events. Analyzer 36 may identify anchor events using time-of-occurrence/synchronicity criteria as described above in relation to FIG. 7-B. Some embodiments may also identify some events as anchors according to event type, by determining that the respective events are particularly important in the lifecycle of application 24. One such example of 'anchor' event comprises granting a specific permission (e.g., access to the microphone, etc.), without which application 24 may not be able to carry out some activities.

Some embodiments may encode sequence 50c as a directed graph, or combine multiple subsequence 'chunks' using Boolean operators, for instance $E_1(E_2$ OR $(E_4E_5))$ $E_3E_2$, etc. In yet another exemplary embodiment, aggregate event sequence 50c may comprise a list enumerating a plurality of alternative event sequences, each alternative event sequence corresponding to a distinct path through a directed graph. Some such alternative event sequences comprise events detected on one device and events detected on another device, for instance the sequence $E_1E_4E_5E_3E_2$ in the example of FIG. 7-C.

Figure 8:
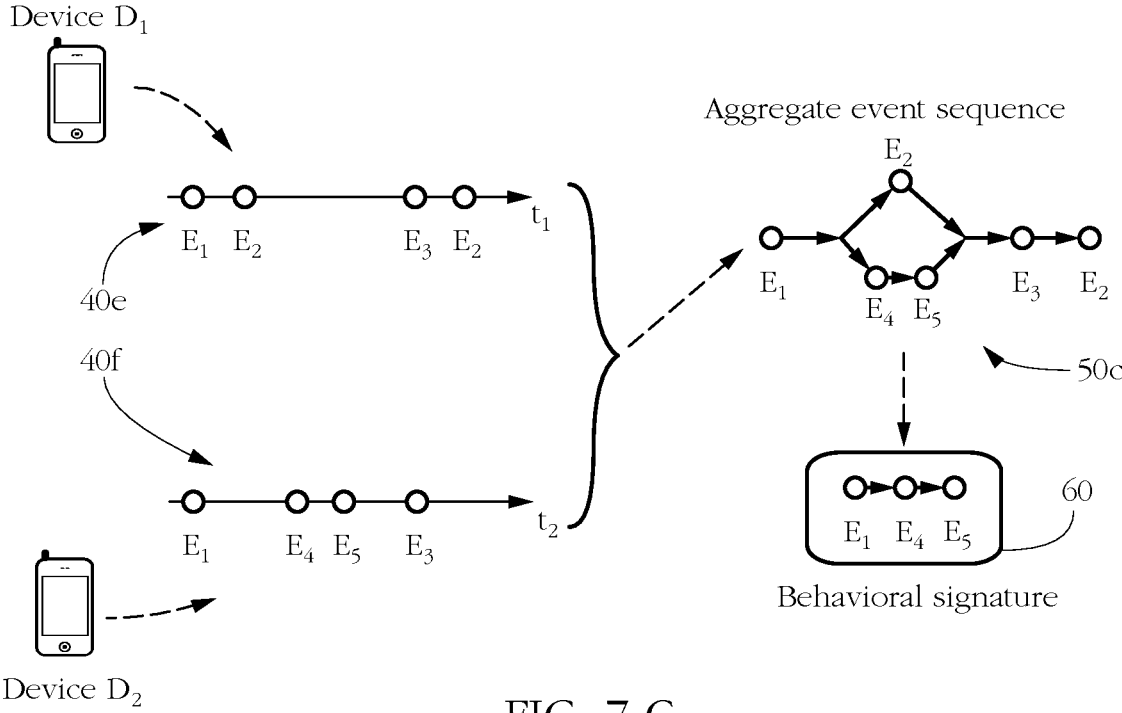
FIG. 8 shows an exemplary aggregate event sequence annotated with various event metadata according to some embodiments of the present invention.

Aggregate event sets and sequences may be enriched with various metadata to facilitate detection of malware and/or determination of behavioral signatures. FIG. 8 shows an exemplary event sequence 50 and associated metadata according to some embodiments of the present invention. For each event of the sequence, data characterizing event sequence 50 may record an indicator of an event type and an indicator of a time of occurrence of the respective event. The time of occurrence may comprise an actual time of the day, an 'application time', or both. The illustration in FIG. 8 shows an exemplary normalized application time spanning an interval between application launch (t=0) and closure (t=1). Real time data may also be useful in cases wherein malware communicates with a command and control (CNC) server that orchestrates malicious activities such as denial of service and other types of attack. In such situations, the malicious payload of an application is typically detonated at approximately the same time on all devices. Therefore, data indicating that a particular event has occurred on multiple devices at approximately the same time may also be useful in detecting malice, and some embodiments use both real time and application time in determining whether target application 24 is malicious.

Other exemplary event metadata may include a ubiquity measure indicative of a count/proportion of devices having detected the respective event. In an exemplary embodiment, a high ubiquity measure indicates that the respective event is ubiquitous. The ubiquity measure may be scaled between pre-determined bounds (e.g. 0 to 1, with 1 indicating that the respective event was detected on all devices in the respective sample). Yet other exemplary event metadata may include a location indicator indicative of a location of client devices having detected the respective event. In the illustrated example, a location indicator includes a list of country codes (e.g., two-letter country codes as defined for instance by the ISO 3166 standard). Including geolocation information may be useful in characterizing applications which behave differently in different regions. Alternative location metadata may include a network address (e.g., IP address, etc.), which may be useful in detecting malicious software targeting specific companies or public places such as malls, airports, schools, etc.

Yet other exemplary metadata that may annotate events of aggregate event set/sequence 50 comprises device profile data (OS version, hardware type, installed apps, etc.) and/or user profile data as determined for instance by profiler 34 as described above. Such profile data may be useful in determining whether target application 24 is malicious and/or in understanding the modus operandi of previously unseen malware. For instance, malware often exploits vulnerabilities that are specific to a particular device type and OS version. Some malware targets specific assets, e.g., Internet banking applications from particular banks, specific trading platforms, etc. Some malware (e.g., Flubot) only attacks devices that have a particular application or category of applications installed (e.g. cryptocurrency apps). Some malware (e.g., Blackrock) propagates within social networks by way of phishing hyperlinks distributed over Instagram®, Facebook®, WhatsApp®, etc. Therefore, the relevance of a particular event may differ according to whether the respective client device has such applications installed or not. In yet another example, some malware may use quick response (QR) codes to direct users to malicious Internet content. However, such malware may only proliferate on devices that run particular apps known to display QR codes, for instance as online ads. User profile data may also prove useful in forensic analysis. For instance, some malware specifically targets users having particular interests (games, entertainment, shopping, etc.) as revealed by their online activity or installed apps.

In some embodiments as illustrated in FIG. 6-B, a step 328 may then use the aggregate event sequence to determine whether application 24 is malicious. Step 328 may use any method or algorithm known in the art of computer security, for instance statistical data, or set of heuristics/rules derived from previously observed malware infections. One exemplary approach determines a reference probability for each event or sequence of events of a certain length, by analyzing a corpus of events caused by known malicious and clean applications. The reference probability may indicate for instance a probability that the respective sequence of events belongs to a malicious application. In step 328, behavior analyzer 36 may decompose the aggregate event sequence determined in step 326 into subsequences for which the reference probabilities are known. Some embodiments then calculate a likelihood that the aggregate event sequence is malicious by combining the respective reference probabilities.

In determining whether the aggregate event sequence is indicative of malice, some embodiments further consider a time separation between events, in either real time or 'application time'. Some sequences of events are malware-indicative when they occur in quick succession (bursting), as opposed to when they are separated by a relatively large gap. Such bursting may be detected in application time. In contrast, some event types may be malware indicative when they are concentrated in real time. Such event clustering in real time may be indicative of a coordinated attack (e.g., denial of service, etc.) orchestrated remotely by a malicious command and control server.

Other exemplary methods use a pre-trained artificial intelligence system configured to ingest the aggregate event sequence and in response, to produce a label or score indicating whether the respective event sequence is malicious. Such methods and systems are beyond the scope of the present description. It suffices to say that several types of neural networks are known to process a set of inputs explicitly according to an ordering of the respective inputs. Examples include various convolutional neural network (CNN) and recurrent neural network (RNN) architectures, among others.

In a further step 330 (FIG. 6-B), behavior analyzer 36 may determine a behavioral signature of application 24 according to the aggregate event sequence. In some embodiments, behavioral signature 60 comprises a subset of characteristic events extracted from the aggregate event sequence, the respective characteristic events arranged in sequence according to a time of occurrence of the respective events. For instance, signature 60 may comprise a subsequence of the aggregate event sequence determined in step 326. Since the aggregate event sequence was assembled from events recorded on multiple clients, distinct parts of behavioral signature 60 may have occurred on distinct client devices.

In some embodiments, behavioral signature 60 characterizes the behavior of target application 24 as a whole, as opposed to just its malicious aspects. For instance, in the case of malicious applications masquerading as genuine/legit, signature 60 may include benign actions of target application 24. In other embodiments, behavioral signature 60 may be constructed to selectively capture only the subset of events/actions which are individually or collectively indicative of malicious behavior. Such behavioral signatures may be further used in detecting malice in other, so far untested applications.

To construct behavioral signature 60, behavior analyzer 36 may parse the aggregated event set/sequence and determine whether to include each member of the aggregate set/sequence into signature 60 according to statistical, forensic, and/or other criteria. One exemplary statistical criterion includes a frequency and/or ubiquity of a selected event. An event which occurs on many client devices (e.g., high ubiquity measure) may be considered characteristic for the behavior of the respective application, and therefore be included in signature 60. However, the respective event type may not be particularly informative or indicative of malware, and therefore may be omitted from a behavioral signature explicitly configured for malware detection. For instance, in situations illustrated in FIGS. 7-A-B-C, event type $E_3$ is ubiquitous but not included in signature 60. Some events may not be malware-indicative when they occur in isolation, but may indicate malice when occurring together with other types of events or in a particular sequence. For instance, the sequence $E_4E_5$ in FIGS. 7-A-B-C may be known to be associated with certain malicious agents and/or attack strategies, and therefore it was included in signature 60. Other exemplary event types typically included in signature 60 are gatekeeper events which condition the occurrence of other events. One such exemplary gatekeeper event comprises setting a particular permission on a mobile device. For instance, when the malicious payload of application 24 includes tracking the respective client device, such malicious activities cannot be carried out without first granting application 24 access to geolocation data.

In some embodiments, in response to determining behavioral signature 60, in a step 208 (FIG. 5), security server 14 may save an encoding of signature 60 in security database 20. Signature 60 may be further incorporated into computer security software and/or protocols used to detect malicious software. When the behavior analysis has determined that application 24 is not malicious (e.g., a step 210 returns a NO), some embodiments return to accumulating event indicators 17 and device profiles 16 from protected client devices 12a-d (FIG. 1). When a determination is made that target application 24 is malicious, a sequence of steps 212-214 may select a set of client devices for notification, and notify the respective devices, respectively. Some security notifications 18 explicitly warn a user of the respective device about a possible malware infection and provide mitigation instructions. Some embodiments notify all client devices 12a-d having the respective target application installed and/or running. Other exemplary embodiments may select a subset of the respective devices according to various criteria such as OS version, geographical location, etc. In one example, a forensic analysis according to an aggregate event set/sequence as described above revealed that target application 24 exploits a particular vulnerability associated with certain versions of OS 22. In response, in step 212 notification dispatcher 38 may select client devices 12a-d currently running the respective OS versions. In another example, behavior analyzer 36 determines that target application 24 specifically targets client devices from Germany and the Scandinavian countries. In response, step 212 may comprise selecting for notification only client devices currently located in the respective regions. Yet another exemplary embodiment may selection clients for notification according to IP address, etc. Step 212 may rely on device profile data 17 collected from the respective devices and/or stored in security database 20.

Figure 9:
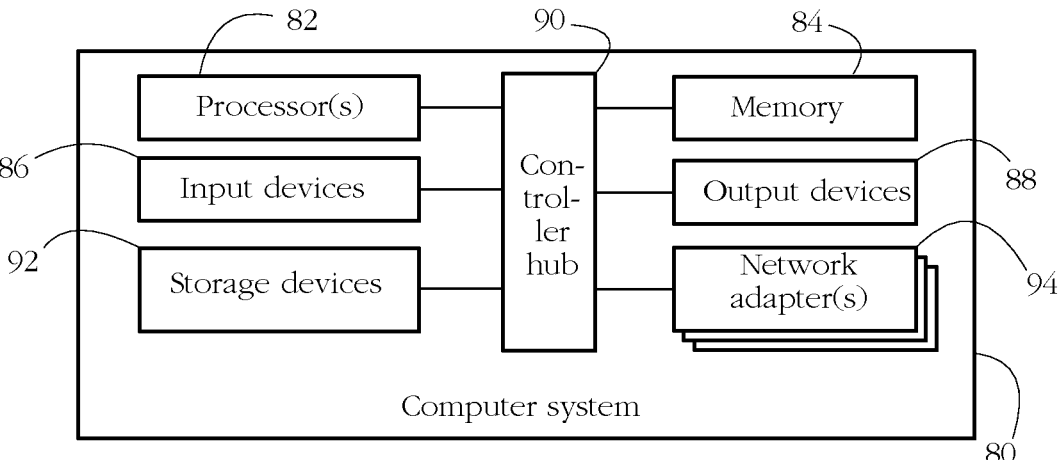
FIG. 9 shows an exemplary hardware configuration of a computer system programmed to perform some of the methods described herein.

The description above shows various methods and algorithms which may be embodied as computer programs executed by a general-purpose hardware processor, but a skilled artisan will understand that the respective functionality may also be implemented using dedicated hardware components, such as an application-specific integrated circuit (ASIC) or field-programmable gate array (FPGA), or using a combination of hardware and software. FIG. 9 illustrates an exemplary hardware configuration of a computer system 80 programmable to carry some of the methods and algorithms described herein. The illustrated configuration is generic and may represent any of client devices 12a-d and/or security server 14. An artisan will know that the hardware configuration of some types of devices (e.g., mobile telephones, smartwatches, servers, routers) may differ somewhat from the one illustrated in FIG. 9.

The illustrated computer system comprises a set of physical devices, including a hardware processor 82 and a memory unit 84. Processor 82 comprises a physical device (e.g., a microprocessor, a multi-core integrated circuit formed on a semiconductor substrate, etc.) configured to execute computational and/or logical operations with a set of signals and/or data. In some embodiments, such operations are specified to processor 82 in the form of a sequence of processor instructions (e.g., machine code) encoding an algorithm for carrying out some of the methods described herein. Memory unit 84 may comprise volatile computer-readable media (e.g., DRAM, SRAM) storing instructions and/or data accessed or generated by processor 82.

Input devices 86 may include computer keyboards, mice, and microphones, among others, including the respective hardware interfaces and/or adapters allowing a user to introduce data and/or instructions into the respective computer system. Output devices 88 may include display devices such as monitors and speakers among others, as well as hardware interfaces/adapters such as graphic cards, allowing the illustrated computing appliance to communicate data to a user. In some embodiments, input devices 86 and output devices 88 share a common piece of hardware, as in the case of touch-screen devices. Storage devices 92 include computer-readable media enabling the non-volatile storage, reading, and writing of software instructions and/or data. Exemplary storage devices 92 include magnetic and optical disks and flash memory devices, as well as removable media such as CD and/or DVD disks and drives. The set of network adapters 94, together with associated communication interface(s), enable the illustrated computer system to connect to communication network 15 (FIG. 1) and/or to other devices/computer systems. Controller hub 90 generically represents the plurality of system, peripheral, and/or chipset buses, and/or all other circuitry enabling the communication between processor 82 and devices 84, 86, 88, 92, and 94. For instance, controller hub 90 may include a memory controller, an input/output (I/O) controller, and an interrupt controller, among others. In another example, controller hub 90 may comprise a northbridge connecting processor 82 to memory 84, and/or a southbridge connecting processor 82 to devices 86, 88, 92, and 94.

The exemplary systems and methods described above enable protecting electronic devices and their users against sophisticated malicious software. Some of the described methods and systems are particularly suited to mobile computing devices such as smartphones, tablet computers, and wearable computers, among others. Such mobile devices typically have substantially less computing power, memory, and storage than other computer systems such as personal computers and servers, and therefore may present specific challenges to the conventional computer security paradigm.

Conventional anti-malware software typically monitors the behavior of software by detecting the occurrence of selected events and applying a set of rules and/or calculations to the detected events to determine whether the respective device is infected. However, observing the behavior of an application may not be technically straightforward, especially on mobile computing devices. Security software may consume substantial resources and thus negatively impact user experience. Some event-detection methods such as hooking various OS functions may not be available on all operating systems and device types. The same application may behave differently on different devices, because some aspects/features of the respective application may necessitate particular OS settings (e.g., specific permissions which may not be granted on all devices).

Furthermore, some sophisticated malware actively tries to evade detection by security software. Some malware agents carefully select their victims by assessing a worth or vulnerability of a user, or a potential reward in attacking a particular host. Stated otherwise, an agent may decide to deploy its malicious payload only on a relatively small proportion of hosts it infects; on all other hosts it may behave as a benign, legit piece of software masquerading for instance as a utility or entertainment application. Other malicious agents are only active on specific types of hardware and/or operating system versions. Yet other malicious agents selectively target clients from particular regions, countries, telecom carriers, etc. In yet another example, a malicious agent may refrain from deploying a malicious payload for a relatively long time interval, thus fooling security software into classifying it as benign. Some such agents are remotely activated by a signal received from a remote entity (commonly known as a command-and-control server), wherein the activation signal may arrive days or even months after the respective application was installed on the respective device.

Device features and malware evasion strategies as described above complicate anti-malware activities at least for the following reasons. First, they make it difficult to observe and characterize the behavior of a malicious application 'in the wild', since the same application may behave differently on different devices. Second, since some applications only reveal their malicious side on a relatively small proportion of the infected hosts, security software may wrongly determine that a client is clean, when in fact it is infected with a malware agent which is currently inactive for various reasons.

Some embodiments of the present invention explicitly address such shortcomings, thereby enhancing the security of mobile computing devices. In some embodiments, an event harvester executes on each protected device and is configured to detect the occurrence of various events caused by the execution of a target application (e.g., mobile app) on the respective device. However, instead of analyzing each locally-detected set of events separately, some embodiments report the respective events to a central security server, which then collates the behavior of the respective target application across multiple devices. Some embodiments compute an aggregate event set and/or sequence combining events detected on one device with events detected on other devices. The security server then determines whether the target application is malicious according to the aggregate event set/sequence. In response to a verdict of malice, some embodiments send a security notification to devices running the respective target application, enabling the users of the respective devices to remove the offending software or otherwise mitigate its effects. Some embodiments may further extract a behavioral signature comprising a reduced subset/subsequence of the aggregate event set/sequence including, for instance, events or actions which are essential for describing the malicious modus operandi of the respective application.

Intuitively, the aggregate event set/sequence describes the behavior of a 'virtual application' collectively representing the set of all individual instances of the respective target application executing on the devices that provided the contents of the aggregate set/sequence. When distinct instances behave differently on distinct devices for any of the reasons outlined above, the aggregate event set and/or sequence capture a unified view of all such behavioral variations.

Some embodiments construct a single aggregate event sequence by ordering events received from multiple devices according to a device-specific 'application time' comprising a time elapsed between the occurrence of each event and a local reference such as a moment when the respective instance of the target application was installed or launched on the respective device. Some embodiments then de-duplicate events which occur identically on multiple devices. The use of application time instead of the actual time-of-the-day time in the construction of aggregate event sequences may facilitate a security analysis by mutually aligning individual event timelines across multiple devices and therefore revealing behavioral patterns and/or anomalies.

Aggregating events from multiple devices as shown herein enables a quick response to emerging security threats. By listening to multiple instances of the same application simultaneously, the security server may assemble a relevant, characteristic event set/sequence and detect malicious content in substantially less time than needed by conventional methods that rely on per-device event sets/sequences. Some monitored instances of the target application may currently be in distinct phases of their lifecycle, which allows for very efficient data collection. Some embodiments further rely on the observation that, when the malicious payload of an application is activated only on a relatively small proportion of infected devices, monitoring many instances of the respective application simultaneously increases the chances of seeing indicators of malicious behavior.

Assembling events from multiple sources further provides rich forensic data that captures behavioral variations (e.g., polymorphism), thus enabling the extraction of unified behavioral signatures usable to effectively detect malware on a variety of devices. The sample of devices providing behavioral data to the server may also be deliberately adjusted according to various criteria, such as to maximize diversity, to emphasize one geographical region over others, etc. Such sophisticated data harvesting may enable the extraction of behavioral signatures with variable granularity.

A strategy of aggregating events across multiple devices may further facilitate malware detection on mobile devices by reducing the computational burden associated with security activities. In some embodiments of the present invention, instead of listening for a comprehensive set of event types on each device, some embodiments may divide behavioral monitoring tasks among multiple devices, for instance by selectively turning some event detectors on or off to save computational resources. The security server may orchestrate such selective data harvesting across devices by transmitting a data request to each client device, the data request specifying a subset of event types to listen for on the respective device. In such embodiments, even if some potentially relevant events will not be detected on some devices, they may be recorded on other devices and thus contribute to an aggregate event set/sequence gathered at the security server.

It will be clear to one skilled in the art that the above embodiments may be altered in many ways without departing from the scope of the invention. Accordingly, the scope of the invention should be determined by the following claims and their legal equivalents.

What is claimed is:

1. A method of protecting against malicious software showing variations in behavior across a plurality of client devices, the method comprising employing at least one hardware processor of a computer system to:

select a first plurality of events and a second plurality of events from a pool of events, the first and second pluralities of events selected to all have been caused by instances of a target software application, wherein:

the first plurality of events was caused by one instance of the target application executing on a client device of the plurality of client devices, and the second plurality of events was caused by another instance of the target application executing on another client device of the plurality of client devices;

merge the first and second pluralities of events into an aggregate event sequence wherein individual events are arranged according to a time of occurrence of each event;

construct a behavioral signature of the target software application according to the aggregate event sequence, the behavioral signature comprising a subset of events of the aggregate event sequence and wherein constructing the behavioral signature comprises including a selected event of the aggregate event sequence into the behavioral signature according to whether the selected event is indicative of malice and further according to whether both the first and second pluralities of events include instances of the selected event; and save the behavioral signature to a repository, wherein the behavioral signature allows a malware detector to detect malicious software according to the behavioral signature.

2. The method of claim 1, wherein merging the first and second pluralities of events comprises determining a position of each event within the aggregate event sequence according to a length of time separating an occurrence of the respective event from a launch of an instance of the target application causing the respective event.

3. The method of claim 1, wherein merging the first and second pluralities of events comprises removing duplicate instances of events from the aggregate event sequence.

4. The method of claim 1, wherein merging the first and second pluralities of events comprises:

arranging the first plurality of events into a first event sequence according to a time of occurrence of each member of the first plurality of events;

arranging the second plurality of events into a second event sequence according to a time of occurrence of each member of the second plurality of events; and concatenating the first and second event sequences.

5. The method of claim 1, wherein determining the behavioral signature comprises including the selected event into the behavioral signature according to a count of devices of the plurality of client devices reporting occurrences of instances of the selected event caused by local instances of the target application.

6. The method of claim 1, wherein the behavioral signature includes a selected subsequence of the aggregate event sequence, the subsequence comprising events caused by the one instance of the target application and events caused by the other instance of the target application.

7. The method of claim 1, further comprising employing the at least one hardware processor to:

select the first and second pluralities of events further according to a device type of the client device and of the other client device, the first and second pluralities of events selected to have occurred on client devices of a selected device type; and associate the behavioral signature with the selected device type.

8. The method of claim 1, further comprising employing the at least one hardware processor to:

select the first and second pluralities of events further according to a geographical location of the client device and of the other client device, the first and second pluralities of events selected to have occurred on client devices of a selected geographical region; and associate the behavioral signature with the selected geographical region.

9. A computer system having at least one hardware processor configured to execute a method of protecting against malicious software showing variations in behavior across a plurality of client devices, the method comprising:

selecting a first plurality of events and a second plurality of events from a pool of events, the first and second pluralities of events selected to all have been caused by instances of a target software application, wherein:

the first plurality of events was caused by one instance of the target application executing on a client device of the plurality of client devices, and the second plurality of events was caused by another instance of the target application executing on another client device of the plurality of client devices;

merging the first and second pluralities of events into an aggregate event sequence wherein individual events are arranged according to a time of occurrence of each event;

constructing a behavioral signature of the target software application according to the aggregate event sequence, the behavioral signature comprising a subset of events of the aggregate event sequence and wherein constructing the behavioral signature comprises including a selected event of the aggregate event sequence into the behavioral signature according to whether the selected event is indicative of malice and further according to whether both the first and second pluralities of events include instances of the selected event; and saving the behavioral signature to a repository, wherein the behavioral signature allows a malware detector to detect malicious software according to the behavioral signature.

10. The computer system of claim 9, wherein merging the first and second pluralities of events comprises determining a position of each event within the aggregate event sequence according to a length of time separating an occurrence of the respective event from a launch of an instance of the target application causing the respective event.

11. The computer system of claim 9, wherein merging the first and second pluralities of events comprises removing duplicate instances of events from the aggregate event sequence.

12. The computer system of claim 9, wherein merging the first and second pluralities of events comprises:

arranging the first plurality of events into a first event sequence according to a time of occurrence of each member of the first plurality of events;

arranging the second plurality of events into a second event sequence according to a time of occurrence of each member of the second plurality of events; and concatenating the first and second event sequences.

13. The computer system of claim 9, wherein determining the behavioral signature comprises including the selected event into the behavioral signature according to a count of devices of the plurality of client devices reporting occurrences of instances of the selected event caused by local instances of the target application.

14. The computer system of claim 9, wherein the behavioral signature includes a selected subsequence of the aggregate event sequence, the subsequence comprising events caused by the one instance of the target application and events caused by the other instance of the target application.

15. The computer system of claim 9, wherein the at least one hardware processor is further configured to:

select the first and second pluralities of events further according to a device type of the client device and of the other client device, the first and second pluralities of events selected to have occurred on client devices of a selected device type; and associate the behavioral signature with the selected device type.

16. The computer system of claim 9, wherein the at least one hardware processor is further configured to:

select the first and second pluralities of events further according to a geographical location of the client device and of the other client device, the first and second pluralities of events selected to have occurred on client devices of a selected geographical region; and associate the behavioral signature with the selected geographical region.

17. A non-transitory computer-readable medium storing instructions which, when executed by at least one hardware processor of a computer system, cause the computer system to execute a method of protecting against malware showing variations of behavior across a plurality of client devices, the method comprising:

selecting a first plurality of events and a second plurality of events from a pool of events, the first and second pluralities of events selected to all have been caused by instances of a target software application, wherein:

the first plurality of events was caused by one instance of the target application executing on a client device of a plurality of client devices, and the second plurality of events was caused by another instance of the target application executing on another client device of the plurality of client devices;

merging the first and second pluralities of events into an aggregate event sequence wherein individual events are arranged according to a time of occurrence of each event;

determining whether the target application is malicious according to the aggregate event sequence;

constructing a behavioral signature of the target software application according to the aggregate event sequence, the behavioral signature comprising a subset of events of the aggregate event sequence and wherein constructing the behavioral signature comprises including a selected event of the aggregate event sequence into the behavioral signature according to whether the selected event is indicative of malice and further according to whether both the first and second pluralities of events include instances of the selected event; and saving the behavioral signature to a repository, wherein the behavioral signature allows a malware detector to detect malicious software according to the behavioral signature.

\* \* \* \* \*